Patented Aug. 2, 1938

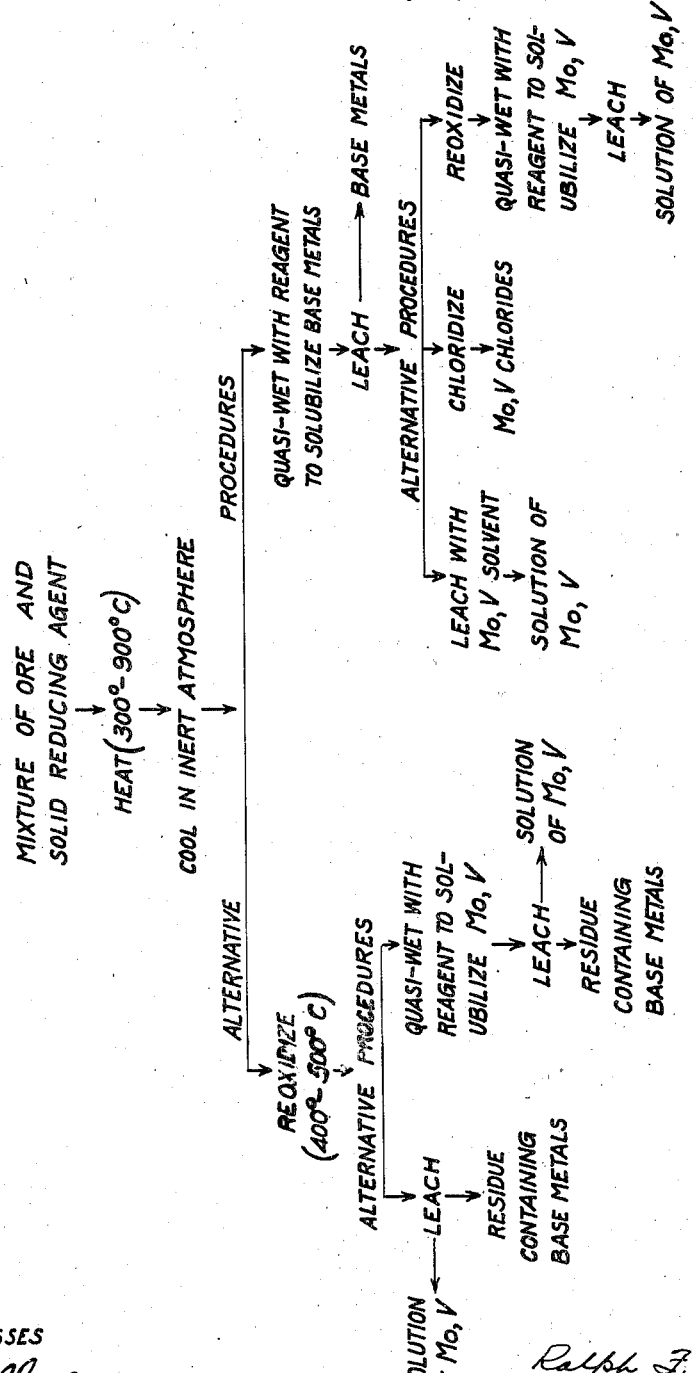

2,125,642

UNITED STATES PATENT OFFICE 2,125,642

METALLURGY OF FERROALLOY METALS

Ralph F. Meyer, Freeport, Pa., assignor to Meyer Mineral Separation Company, Pittsburgh, Pa., a corporation of Delaware Application July 27, 1934, Serial No. 737,239

4 Claims. (Cl. 23—15)

This invention relates to the recovery of the rarer metals from their ores, and more particularly to the recovery of the ferro-alloy metals, such as molybdenum, vanadium and tungsten, for which reason it will be described with particular reference thereto.

The method provided by the invention is applicable not only to the treatment of ores, but also to the treatment of concentrates and other materials containing these metals, all of which are contemplated by the term "ore materials" as used herein.

It is among the major objects of this invention to provide a method of recovering the ferro-alloy metals from their ore materials which is simple, easily performed, highly efficient, affords excellent separation of these metals from other metals, such as the base and precious metals, and is more efficient and more economical than the procedures heretofore available.

A special object of the invention is to provide a method of recovering lead from ore materials which is inexpensive, efficient, and provides a relatively clean separation of this metal from other metals present in the material undergoing treatment, and in which the reagent used may be cyclically regenerated and reused.

A particular difficulty that has been encountered hertofore in this art is that the metals are bound in the form of complexes which are especially refractory against ordinary procedures, so that their recovery has heretofore been attended by relatively great expense, especially due to the large quantities of reagents used, and in some procedures, to the power requirements.

The invention is predicated upon my discovery that molybdenum, vanadium and other rare or ferro-alloy metals may be recovered easily from ore materials by mixing the material with a solid reducing agent, then heating it and effecting partial reduction of ore constituents, and thereafter cooling the thus treated material in a non-oxidizing, or inert, atmosphere to a normal temperature, or at least to a temperature below the sintering temperature of the normal oxide of the ferro-alloy metal, or metals, present in the ore.

This procedure efficiently breaks up and segregates the metals of the highly refractory complexes in which the metals occur in such ore materials, and it renders the various metallic constituents amenable to ready separation and recovery. More particularly, this treatment converts the valuable constituents of the ore to forms in which it is possible readily and easily to separate the preponderance of the base metals by simple, cheap procedures, giving clean separations among themselves and from the ferro-alloy metals. And the ferro-alloy metals are released from their natural complexes in the form of their lower oxides, which are in a state especially reactive to customary treatments, such as chloridizing, or convertible to their higher normal oxides, which are easily and quite completely leachable by appropriate liquids, such as, for example, dilute acids and alkalies. The basis of the invention thus resides in a partial reduction whereby the complexes are destroyed and the multi-valent metals converted, at least in part, to lower oxides easily and efficiently susceptible to extraction.

Furthermore, by such a partial reduction the metal complexes are so completely broken up and segregated that the metals may be separated from the gangue and from each other by flotation methods.

To the end just stated, important features of the invention reside in mixing the reducing agent with the ore prior to heating it, and in cooling the reduced ore to normal temperature, or to a temperature below the sintering temperature of the normal oxide (e. g., $V_2O_5$, $MoO_3$) of the ferro-alloy metal prior to exposing it to the atmosphere.

I have found that if the ore becomes sintered the recovery of the metals if not substantially precluded by the simple means characteristic of the invention, is certainly much less efficient. I have found also that to avoid such sintering the ore should be intimately mixed with the reducing agent prior to elevating its temperature. The particles of reducing agent apparently serve to hold the ore particles apart and prevent them from sintering. Also, the more intimately the reducing agent is mixed with the ore, the better is the reduction and breaking up of the refractory complexes. The effect of these factors is especially important in the case of ore materials high in easily fusible compounds of lead.

The material in the partly reduced form does not sinter, first, because the melting point of the lower oxides of the ferro-alloy metals is considerably higher than the reduction temperature used. Second, lead oxides fuse at relatively low temperatures and sinter with the ore constituents very readily, but if the solid reducing agent is thoroughly mixed with the ore before heating, the lead oxide is reduced to a lower oxide, or even metallic lead, before sintering or fluxing can take place, and this reduced lead product does not cause sintering. By a very slow, low temperature reduction using hydrogen or carbon monoxide the same end may be approached, but not nearly as efficiently as by mixing the reducing agent with the ore as described.

Having effected the partial reduction and cooling with preservation of the desirable qualities produced, which characterize this invention, in the foregoing manner, the metallic constituents may be recovered in various ways, the treatment, as just noted, having placed the ore in condition for efficient treatments according to a selection of procedures, all of which afford the clean separations and high recoveries sought in this art. For example, the base metals may be separated from the ore by known methods, or by a special and novel procedure presently to be described, after which the ferro-alloy metals may be removed, as by leaching. Or, the base metals having been removed, the residue containing the ferro-alloy metals may be subjected to a chloridizing treatment, the reduced oxides of these metals being in a form especially adapted for such treatment. More suitably for most purposes, however, the ore is reoxidized, either before or after recovery of the base metal, to convert the ferro-alloy oxides to their higher, or normal, state of oxidation. In this condition these oxides, having been freed from their natural refractory complex forms, can be recovered easily by reagents known to the art. After reoxidation the molybdenum is in a form particularly amenable to flotation separation methods. The various metals are recovered from their solutions according to known methods.

In the practice of the invention the ore material is intimately mixed with an appropriate amount of solid reducing agent, e. g., a carbonaceous reducing agent, advantageously coal. It is advantageous to grind them together, for not only does this effect the desired intimate commingling, but also it is desirable to have the ore ground. The mixture is then heated to effect partial reduction of ore constituents, and thereby to break up the refractory complexes. In the case of most ores reduction may be effected suitably at temperatures of about 300° C. to about 900° C. With some ores a very short heating suffices, while others may require heating for several hours, say two or three. I have found that in such instances it usually suffices to bring the ore up to temperature, and then give it a soaking treatment at temperature in a heat insulated soaking chamber, or pit, for a suitable length of time, for example, one to three hours. The ore sufficiently retains its temperature to effect the desired reduction without the addition of heat during the soaking period.

After reduction the ore is carefully cooled in an inert, or non-oxidizing atmosphere, such as the reducing atmosphere of the reduction step, to room temperature, or a temperature below the sintering temperature of the normal oxide, or oxides, of the ferro-alloy metal, or metals, concerned. For example, molybdenum trioxide melts at about 795° C. and vanadium pentoxide at 658° C. The sintering point is apparently much lower in the case of both of these oxides so that the reduced ore should be carefully cooled in a non-oxidizing atmosphere to a lower temperature. The cooling should be continued to room temperature in contact with the inert atmosphere where the metal values are to be recovered by leaching or the like methods, but where the ore is to be reoxidized before the base metals are removed it need be cooled only to a temperature suitable therefor with avoidance of sintering. For reoxidation most of the heat necessary may be supplied by the carbon left in the material after the partial reduction.

The ore is now in condition for recovery of the various metallic constituents.

As an example of the practice of the invention, and of the various modes in which the metals may be recovered, reference may be had to the treatment of a concentrate containing 6.66 per cent of Mo calculated as $MoO_3$, 6.72 per cent of V calculated as $V_2O_5$, 16 per cent of zinc, about 28 per cent of lead, 0.64 per cent of copper, 0.6 per cent of aluminum calculated as $Al_2O_3$, 23.55 per cent of iron calculated as $Fe_2O_3$, 16.5 per cent of silica, and 1.76 per cent of calcium calculated as CaO. This concentrate was mixed with 10 per cent by weight of coal, the mixture was ground, and the ground mixture was then heated in a muffle to about 750° C. and soaked at that temperature for one hour, following which it was cooled in an inert atmosphere to room temperature. This treatment broke up the refractory complexes of molybdenum, vanadium, lead and the like, rendering all of the metals which it is desirable to recover amenable to treatments, except for the zinc, which with silica, iron, etc. was thereby left insoluble in the reagents suitably used for the recovery of the base and ferro-alloy metals. This is desirable because it provides the very clean separation of the zinc, iron, silica, and the like, from the remaining constituents.

The base metals, such as copper and lead, and other base metals when present, may be removed first, and this may be done by known methods. Advantageously it is accomplished by application of the quasi-wet principle disclosed in my earlier patents, among which are No. 1,833,682, No. 1,898,018, and others. In such a quasi-wet procedure the ore is mixed with a liquid in an amount sufficient to moisten the individual ore particles, but in an amount insufficient to provide free liquid between the interstices of the ore particles. In this condition the volume of the ore increases substantially, as compared with an ore which is dry, and as compared with ore containing excess liquid. It is of loose and open structure particularly adapted to rapid attack of reagents, particularly gaseous reagents, whereby rapid and far reaching effect of reagents is produced, and the ore is in excellent condition for leaching. Also, in quasi-wet condition the ore is not appreciably moist to sight or touch, it requires considerable hand pressure to compact it, but it easily crumbles again. The amount of liquid required for quasi-wetting varies with different ore materials, but it is readily ascertainable by observation in any particular instance owing to the fact that the volume increases over that of the ore prior to addition of liquid, and over that of the ore when excess of liquid (free liquid) is present. The liquid used may be water, in which case a reagent may be introduced into the ore subsequently, such as air for oxidation, or a chloridizing gas, or other reagent. Or, if desired, the ore may be rendered quasi-wet with a liquid reagent itself, such as an acid or other solution know to the art. And both such treatments may be combined.

The ore may also be moistened by water vapor, or by water vapor combined with a gaseous reagent, such as acetic acid vapor, hydrochloric acid vapor, etc. In such cases the moisture content is easily controlled by regulating the temperature of the material.

With ores containing lead it is desirable to use a novel procedure which I have discovered to be especially suitable and which constitutes an important aspect of the invention. To this end the lead is extracted as acetate by the use of aqueous acetic acid, or acetic acid vapor, applied by the quasi-wet principle. Thus, the ore is rendered quasi-wet with a solution or vapor of acetic acid at a suitable temperature, and through such use of this reagent there is rapid conversion of the lead to acetate, which is easily soluble. This reagent renders the copper soluble also, but if the quasi-wet material be treated with only enough acetic acid to combine with the lead it is possible to remove the preponderance of the lead in substantially pure solution, and particularly to effect a relatively clean separation of the lead and copper.

For example, referring to the foregoing ore, treated as described, a portion of the reduced ore was rendered quasi-wet with about 35 per cent by weight of a 60 per cent solution of acetic acid added gradually in about 60 minutes. Considerable heat was developed, and part of the water was vaporized and driven off. The conversion of the lead to its acetate was very rapid. The temperature remained at about 95° C. during the addition of acid. After twenty minutes aging about 75 to 80 per cent of the lead was leached out with water, giving a substantially pure solution of lead acetate.

The acetic acid may be regenerated and the lead recovered by gassing the strong lead acetate solution with sulfur dioxide, which causes the lead to be precipitated as lead sulfite, regenerating the acetic acid for further leaching. The lead sulfite may be worked up in various ways to convert it to other lead compounds, or it may be smelted to convert it to metallic lead, thus regenerating the sulfur dioxide for use in treating further lead acetate leach solutions.

If the reduced material is treated with water vapor and acetic acid vapor at about 80–95° C. the ore remains fine and loose, and it does not become sticky, and the base metals can be completely solubilized in one operation if desired. Also, very dilute acetic acid may be thus utilized and the reduced material then acts as a scrubbing agent whereby the acetic acid combines with the metals and the excess of water vapor over that necessary to maintain the quasi-wet condition passes out of the reaction chamber. Due to the temperature of 80° to 95° C. the excess water is not permitted to condense into the ore and is therefore carried off completely separated from the acid. Of course, some amount of water will condense into the ore to quasi-wet it, this condition being controlled by the temperature.

Crude or purified pyroligneous acid may also be used intsead of pure acetic acid, the acetic acid content being absorbed and combined with ore constituents as just described, while acetone and other constituents remain free and pass out of the reaction chamber free from acetic acid, so that they may be recovered readily. An efficient separation of acetic acid and acetone may thus be realized.

The ore residue remaining after lead separation is washed, dried and again rendered quasi-wet with acetic acid, following which it is aged for twenty-four hours in air. Thereafter it is leached with water, which removes copper together with a further amount of lead. By this treatment about 95 per cent of the lead and copper may be removed.

The ease and simplicity of this acetic acid procedure, and its rapidity are especially desirable, as is also the fact that by due precaution as to amount of acetic acid used, a substantially pure solution of lead is obtained. Of course, if copper and the like are absent, the amount of acid used is less important. This leaching procedure is of general applicability to all types of lead-bearing ores, whether or not ferro-alloy metals be present. Low iron solubility results from restriction of the amount of acetic acid and from elevated temperature (80° to 95° C.), and this follows largely from quasi-wetting, which permits only restricted amounts of liquid. At a temperature of 80–95° C. practically no iron is solubilized.

In general, non-ferro-alloy lead bearing ores do not require the addition of the reducing agent before heating, since the lead content is usually less than about 10 per cent and therefore is diluted by the gangue sufficient to avoid sintering. Also, the lead is usually in the form of sulfide or sulfate, which do not sinter readily. Any combustible reducing agent will suffice in such cases.

The lead acetate-leach solution may also be used to quasi-wet other lots of ore, whereby impurities are deposited into the ore, and lead solubilized. Very pure solutions of lead acetate are obtained in this way. This is due to the fact that lead has a greater affinity for the acid reagent than copper or iron.

In this purification operation the presence of air is an advantage. Iron may be removed completely from lead acetate solution by merely boiling it.

The residue substantially free from lead and copper containing the ferro-alloy metals and gangue, may be treated in various ways for the recovery of the ferro-alloy metals. In the condition described the ferro-alloy metals are present largely in the form of their lower oxides, for which reason they are easily susceptible to chloridiizng treatments. Thus, the ore may be dried and treated at about 200° to 300° C. with a current of chlorine, whereby the ferro-alloy metals will be converted to and volatilized as chlorides or oxychlorides. In this manner better than 90 per cent recovery of Mo and V was obtained. Ordinarily, the action of the chlorine, hydrogen chloride, or other chloridizing gas, upon the lower oxides of the ferro-alloy metals will develop enough, or almost enough, heat to carry out the volatilizing operation. Any gold and silver present will likewise be chloridized and these chlorides may be recovered by known methods.

Another method which may be used for treatment of the reduced ore is to subject the material to the quasi-wet chloridizing procedure described and claimed in my Patent No. 1,822,995. In this case gold and silver are chloridized, the lower oxides of molybdenum, vanadium and other ferro-alloy metals being reoxidized to the normal oxides, care being taken to operate at a temperature below the melting or sintering points of their normal oxides so as to preserve the ore in a form which is readily amenable to leaching reagents. Volatile chlorides are not formed in this procedure because of the moisture which is present. The ferro-alloy metals may now be recovered readily by simple leaching, as by dilute acids and alkalies. An advantage of such a procedure is that the iron, silica, and other gangue materials are converted to a form which is substantially insoluble in these leaching reagents. Applying such a treatment to the above-described ore, and leaching with a dilute solution of sodium hydroxide, there was recovered 100 per cent of the molybdenum present, and 91.5 per cent of the vanadium.

The condition of the reduced ore is such that the base metals may be leached directly with appropriate solutions, without resort to the foregoing methods, although they are preferable because of their efficiency and the clean separations obtained.

Still another method that may be used, and probably that one is perferable for most purposes, consists in reoxidizing the reduced material, either before or after removal of the lead and copper, at a temperature below the sintering or melting point of the normal oxides of the ferro-alloy metals, and then recovering the latter either by application of the quasi-wet principles described, or by ordinary leaching. In this instance, however, it is advisable first to remove the lead if it is present in substantial amount and if it is proposed to leach the ferro-alloy metals with caustic soda, as otherwise much lead will go into the solution and thus render subsequent separations more difficult or more expensive.

Such a reoxidizing treatment will be effected by heating the reduced material in air to a temperature of about 400° or 500° C. A portion of the reduced ore described above was reoxidized in this manner after removal of the lead and copper. After reoxidation it was digested and leached with a warm 7 per cent solution of sodium hydroxide. The recovery was as follows:

$MoO_3$___ 97.2% of the total molybdenum present
$V_2O_5$___ 91.7% of the total vanadium present
$Fe_2O_3$___ 0.02% of the total ore weight present
Lead___ 0.75% of the total ore weight present
Zinc___ 0.51% of the total ore weight present
Silica___ 2.25% of the total ore weight present It will be seen that not only has the preponderance of the molybdenum and vanadium been removed by such a treatment, but also that the solution is substantially free from iron, and that the amount of lead and zinc is very low, which is of great advantage, as will be recognized by those skilled in the art.

Still another portion of the reduced ore was carefully reoxidized to avoid sintering, before removal of the lead and copper, and it was treated with dilute caustic soda solution in the same manner. In this instance the recovery was as follows:

$MoO_3$_____ 89.1% of the molybdenum present
$V_2O_5$_____ 87.2% of the vanadium present
$Fe_2O_3$_____ 0.03% of the iron present
Zinc_____ 4.7% of the zinc present
Lead_____ 64.0% of the lead present
Silica_____ 23.0% of the silica present Inasmuch as this particular ore was rather high in lead, this comparative test illustrates the benefit derived from preliminary separation of lead, as just noted.

A feature of the reoxidation treatment is that the iron, which was converted to the reactive ferrous form in the reduction, is substantially insolubilized thereby, as shown by both of the last two tests. The advantage of this needs no elaboration.

As illustrative of the recovery of the ferro-alloy metals by application of the quasi-wet principle, as referred to hereinabove, reference is made to a test of the ore described hereinabove. The ore was reduced with 10 per cent by weight of coal by heating the mixture to about 750° C. in a muffle and soaking at that temperature for one hour following which it was cooled in an inert atmosphere to room temperature. This treatment broke up the refractory complexes of molybdenum, vanadium, lead, and generally of the metals desired to be recovered, except zinc, which with silica, iron, etc., was left substantially insoluble in the reagents used in subsequent steps. Lead was removed from the reduced material by rendering it quasi-wet with acetic acid solution, using about 35 per cent by weight of a 60 per cent solution of the acid. This was added gradually to the ore during about one hour. Considerable heat was developed, and a part of the water was vaporized and driven off. The quasi-wet material was aged about twenty-four hours, following which it was leached, thus recovering 94 to 95 per cent of the lead in substantially pure solution. The leached residue was oxidized one hour at 400° to 500° C., and after cooling it was quasi-wet with a 30 per cent solution of sodium hydroxide added gradually during thirty minutes while heating the ore to between 80° and 90° C. Sufficient solution was used to introduce 12 per cent of NaOH into the material. It was then aged twenty-four hours and leached with water, with the following results: 92.1 per cent of vanadium recovered as sodium vanadate, and 99 per cent of the molybdenum recovered as sodium molybdate. The solution contained no lead or silica and mere traces of iron and zinc. The purity of the leaching solutions and the high recoveries attest the benefits of such a procedure.

Still another method of treatment comprises reoxidizing the material carefully, and without removing the base metals, such as lead or copper, treating with a dilute acid, such as dilute sulfuric or dilute hydrochloric acid, whereby more than 90 per cent of the molybdenum and vanadium are solubilized. In this case, however, somewhat larger amounts of iron and zinc are put into solution, which may cause trouble in the recovery of the leached metals. The lead is not affected by this treatment, however, and the residue in this instance may be worked up to recover the lead, gold, silver, and other base metals where present as by standard smelting procedures.

As indicating the necessity for adding the solid reducing agent prior to the reduction step, a further sample of the same ground concentrate was heated to 650° C. in an atmosphere of natural gas, and ground coal was then added, following which the ore was reduced and soaked two hours at 750° C. After cooling the ore was black in color, dense, and of a sandy nature. In contrast to the foregoing tests, this ore was almost inert to acetic acid used in the quasi-wet way. Leaching agents, such as those used hereinabove, had practically no effect on the ore, and no extraction of the lead, molybdenum or vanadium could be obtained. It appears, therefore, that the addition of the solid reducing agent prior to heating in accordance with this invention, is a feature of material importance which leads to the desired result.

The molybdenum, vanadium, or other ferro-alloy metal is recovered by known methods from the solutions obtained, and the caustic solutions may be automatically regenerated, as by the addition of milk of lime to precipitate the metals out of the caustic solution, thereby also causticizing the latter.

In case the ore is reoxidized without the previous removal of the base metals, the cooling in a non-oxidizing atmosphere need be continued only to a point below the melting or sintering temperature of the normal oxides, and reoxidation can then be effected. Thus, the ore may be cooled to below about 500° C., but above about 400° C., and reoxidized.

The zinc-containing gangue may, of course, be treated to recover its zinc content.

Also, as noted, the treatment renders the material amenable to flotation either before or after separation of base metals.

The invention is particularly adapted to the recovery of molybdenum and vanadium from ore materials containng them, but since it is likewise applicable to other metals of the class generally designated as ferro-alloy metals that term is used in the appended claims for brevity of reference.

According to the provisions of the patent statutes, I have explained the principle of my invention, and have described what I now consider to represent its best embodiment. However, I desire to have it understood that, within the scope of the appended claims, the invention may be practiced otherwise than as specifically described.

I claim:

1. In a method of recovering a ferro-alloy metal of the group molybdenum, vanadium, tungsten from ore material, that combination of steps comprising forming an intimate finely divided mixture of ore material and solid carbonaceous reducing agent, then heating the mixture and effecting partial reduction of the ore, without fusing or sintering and without substantial reduction of ore constituents to the metallic condition and removal from the ore, to convert the ferro-alloy metal to oxidized form in a lower state of valence, cooling under non-oxidizing conditions to normal temperature, rendering the cooled ore quasi-wet with acetic acid solution, leaching lead and copper from the ore, and treating the residue to recover its ferro-alloy metal content.

2. In a method of recovering a ferro-alloy metal of the group molybdenum, vanadium, tungsten from ore material, that combination of steps comprising intimately mixing the ore in finely divided condition with coal, then heating the mixture to about 300° C. to 900° C. and effecting partial reduction of the ore, without sintering or fusing and without substantial reduction of ore constituents to the metallic condition and removal from the ore, to convert the ferro-alloy metal to oxidized form in a lower state of valance, cooling under non-oxidizing conditions to a temperature below the sintering temperature of the normal oxide of the ferro-alloy metal, treating the ore with a reagent to remove base metal, such as lead, from the ore, then reoxidizing at a temperature below said sintering temperature, mixing the reoxidized material with sufficient solution of reagent adapted to solubilize the ferro-alloy metal to render the material quasi-wet, and thereafter leaching the solubilized ferro-alloy metal from the ore.

3. In a method of recovering a ferro-alloy metal of the group molybdenum, vanadium, tungsten from ore material, that combination of steps comprising intimately mixing the ore in finely divided condition with coal, then heating the mixture to about 300° C. to 900° C. and effecting partial reduction of the ore without sintering or fusing and without substantial reduction of ore constituents to the metallic condition and removal from the ore, to convert the ferro-alloy metal to oxidized form in a lower state of valance, cooling under non-oxidizing conditions to a temperature below the sintering temperature of the normal oxide of the ferro-alloy metal, reoxidizing at a temperature below said sintering temperature, mixing the oxidized material with sufficient solution of alkali hydroxide to render the material quasi-wet, aging the quasi-wet ore, and then leaching ferro-alloy metal from the ore.

4. In a method of recovering a ferro-alloy metal of the group molybdenum, vanadium, tungsten from ore material containing lead, that combination of steps comprising forming an intimate finely divided mixture of ore material and a solid carbonaceous reducing agent, then heating the mixture and effecting partial reduction of the ore, without sintering or fusing and without substantial reduction of ore constituents to the metallic condition and removal from the ore, to convert the ferro-alloy metal to oxidized form in a lower state of valence, cooling under non-oxidizing conditions to a temperature below the sintering temperature of the normal oxide of the ferro-alloy metal, treating the ore with a reagent to remove lead therefrom, reoxidizing the ore at a temperature below said sintering temperature, and treating the thus-treated ore with aqueous sodium hydroxide to recover its ferro-alloy metal content.

RALPH F. MEYER.